US007539485B2

(12) United States Patent
Ono et al.

(10) Patent No.: US 7,539,485 B2
(45) Date of Patent: *May 26, 2009

(54) APPARATUS AND METHOD FOR MAPPING A LOCATION OF WIRELESS BASE STATIONS IN A MOBILE COMMUNICATION SYSTEM

(75) Inventors: Naoko Ono, Tokyo (JP); Hiroki Shoki, Kanagawa-ken (JP); Ichiro Seto, Tokyo (JP); Takehiko Toyoda, Tokyo (JP); Hiroshi Yoshida, Kanagawa-ken (JP); Shuichi Sekine, Kanagawa-ken (JP); Kuniaki Ito, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/924,315

(22) Filed: Oct. 25, 2007

(65) Prior Publication Data

US 2008/0096582 A1   Apr. 24, 2008

Related U.S. Application Data

(63) Continuation of application No. 10/715,395, filed on Nov. 19, 2003, now Pat. No. 7,305,232.

(30) Foreign Application Priority Data

Nov. 29, 2002   (JP)   ............................... 2002-346913

(51) Int. Cl.
*H04M 3/42*   (2006.01)
*H04M 3/493*   (2006.01)

(52) U.S. Cl. ................ 455/414.2; 455/414.1; 455/41.2; 455/456.1; 455/456.3; 455/552.1; 455/566

(58) Field of Classification Search ...... 455/456.1–457, 455/414.1, 414.2, 41.2, 552.1, 566
See application file for complete search history.

(56) References Cited

U.S. PATENT DOCUMENTS

| 5,805,999 | A | 9/1998 | Inoue |
| 6,754,488 | B1 | 6/2004 | Won et al. |
| 2002/0006788 | A1 | 1/2002 | Knutsson et al. |

(Continued)

FOREIGN PATENT DOCUMENTS

JP   7-143544   6/1995

(Continued)

*Primary Examiner*—Vincent P. Harper
*Assistant Examiner*—Ariel Balaoing
(74) *Attorney, Agent, or Firm*—Oblon, Spivak, McClelland, Maier & Neustadt, P.C.

(57) ABSTRACT

An apparatus used in a first mobile communication system with a plurality of wireless base stations, the first mobile communication system operated by a first provider, the apparatus including an acquiring unit, a location detecting unit configured to detect a present location of the apparatus, a storing unit configured to store first service location information with respect to the first provider, and a location information providing unit configured to calculate locally a location of the plurality of wireless base stations using the detected present location of the apparatus stored in the storing unit. The location information providing unit is configured to provide a user with information based on the first service location information and the second service location information.

8 Claims, 6 Drawing Sheets

U.S. PATENT DOCUMENTS

| | | |
|---|---|---|
| 2002/0059453 A1 | 5/2002 | Eriksson et al. |
| 2002/0183038 A1 | 12/2002 | Comstock et al. |
| 2004/0056798 A1 | 3/2004 | Schmidt |

FOREIGN PATENT DOCUMENTS

| | | |
|---|---|---|
| JP | 2000-106689 | 4/2000 |
| JP | 2002-236632 | 8/2002 |
| WO | WO 01/50151 A1 | 7/2001 |

APPARATUS AND METHOD FOR MAPPING A LOCATION OF WIRELESS BASE STATIONS IN A MOBILE COMMUNICATION SYSTEM

CROSS REFERENCE TO RELATED APPLICATIONS

This application is a continuation of U.S. application Ser. No. 10/715,395, filed Nov. 19, 2003 and claims benefit of priority under 35 USC § 119 to Japanese Patent Application No. 2002-346913, filed on Nov. 29, 2002, the entire contents of which are incorporated by reference herein.

BACKGROUND OF THE INVENTION

1. Field of the Invention

The present invention pertains in general to a mobile communication terminal used in a mobile communication system having a plurality of wireless base stations which provide contents data, and more particularly, to an apparatus and method for mapping a location of the wireless base stations in the mobile communication system.

2. Related Art

As the number of mobile communication users increases and the services have become more versatile, various mobile communication systems have been provided by a plurality of providers. There is a rapidly increasing demand for multi-mode mobile terminals being able to adapt to plural wireless communication systems.

The combination of a low-data-rate information providing service targeted at wide cell coverage such as cellular systems and a large-capacity information providing service targeted at spot areas covered by wireless LANs (Local Area Networks) enables both small-capacity communications over a wide-bandwidth and large-capacity communications over a narrow-bandwidth.

A large-capacity service targeted at spot areas such as wireless LANs is a service that enables high-speed, large-capacity communications by bringing a mobile communication terminal into a certain spot area (see JP-A-2000-106689).

In order for the user of a mobile communication terminal to utilize services, it is necessary for the user to obtain information in advance, by some method, about spot areas offered by wireless LAN providers. When the user needs to receive services, the terminal is first brought into a spot area, where the user begins to receive the wireless LAN services.

Therefore, it has been desired for such users to generate a map showing the location of spot areas where the wireless base stations provide contents data service effectively.

SUMMARY OF THE INVENTION

The present invention has been made in view of the foregoing. It is an object of the present invention to provide a mobile communication terminal permitting a user to easily obtain location information of wireless base stations which provide contents data service in certain areas.

In accordance with one aspect of the present invention, the forgoing object is achieved an apparatus used in a mobile communication system having a plurality of wireless base stations, comprising: a location detecting unit configured to detect a location of said apparatus; an acquiring unit configured to acquire identification information of said wireless base stations; an storing unit configured to store the acquired identification information being associated with the detected location of said apparatus; a location information providing unit configured to figure a location of said wireless base stations using the detected location of said apparatus stored in said storing unit and to provide the figured location of said wireless base stations.

In accordance with one aspect of the present invention, the forgoing object is achieved a method for mapping location information of a wireless base station which provides contents data to a mobile communication terminal, comprising: acquiring identification information of said wireless base stations; detecting a location of said terminal; storing the acquired identification information of said wireless base stations being associated with the detected location of said terminal; figuring the location of said wireless base stations based on the detected terminal location associated with the acquired identification information of said wireless base stations; and providing map information indication information of the figured location of said wireless base stations.

The mobile communication terminal constructed in this way in accordance with the present invention includes functions of detecting positional information and storing identification information about each wireless communication system base station with which a connection can be made and positional information about the mobile communication terminal capable of connecting with the base stations. Thus, it might be easy for the user to recognize the services available in a certain area (e.g., the present location).

DESCRIPTION OF THE PREFERRED EMBODIMENTS

The mobile communication terminal according to the present invention is hereinafter described in detail with reference to the drawings.

Figures 1, 2:
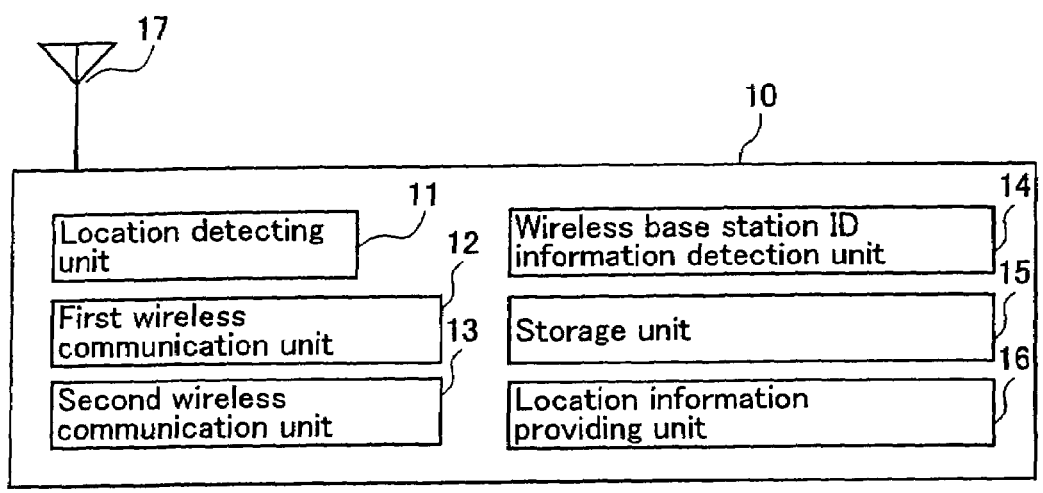
FIG. 1 is a functional block diagram of a mobile communication terminal illustrating an embodiment of the present invention.
FIG. 2 is a diagram illustrating one example of the contents of a table in a storage unit illustrating an embodiment of the invention.

FIG. 1 is a schematic block diagram of a mobile communication terminal that is an embodiment of the present invention. In the present embodiment, the mobile communication terminal normally communicates as a cellular telephone with other terminals, and has wireless LAN functions to be able to receive contents data services at wireless LAN spot areas.

The mobile communication terminal, indicated by 10, has a location detection unit 11 using GPS (Global Positioning System) technology, a first wireless communication unit 12 using a narrow-bandwidth typified by wireless LANs (pursuant to IEEE802.11), a second wireless communication unit 13 using a wide-bandwidth and typified by a cellular telephone, a wireless base station identification (ID) information detection unit 14, a storage unit 15, a location information providing unit 16, and an antenna 17.

In order to realize each function, additional hardware or software may be installed. However, it is not necessary that an independent block realize each function. A common CPU or the like may realize the functions.

The antenna 17 is mounted to each of the first wireless communication unit 12 and second wireless communication unit 13. Furthermore, to achieve the functions of diversity or MIMO (Multiple Input Multiple Output), each of the first wireless communication unit 12 and second wireless communication unit 13 may be fitted with plural antennas. The antenna 17 also serves an antenna for location detection unit 11 using the GPS technology.

The storage unit 15 is a memory, which stores identification information of the base station when wireless LAN services are received using the first wireless communication unit 12. The storage unit 15 also stores the location information of the mobile communication terminal in a table. One example of this table is shown in FIG. 2. As shown in FIG. 2, the identification information of wireless base stations (BSID) is stored associating with the location of the terminal (MS location) which was detected at the time of acquiring identification information of the wireless base stations. The identification information of wireless base stations and the detected location of the terminal are accumulated in the table.

The items, which are able to store in this table are (1) identification information of each base station of wireless LAN, location information of the mobile communication terminal, and/or (2) the time when contents data services were received, (3) the information indicating the kinds of services that can be received (for example, music data, speed of the data) (4) fee structure for the services, and so on.

The location information providing unit 16 provides the user of the terminal with information of the service area based on the information stored in storage unit 15.

Figure 3:
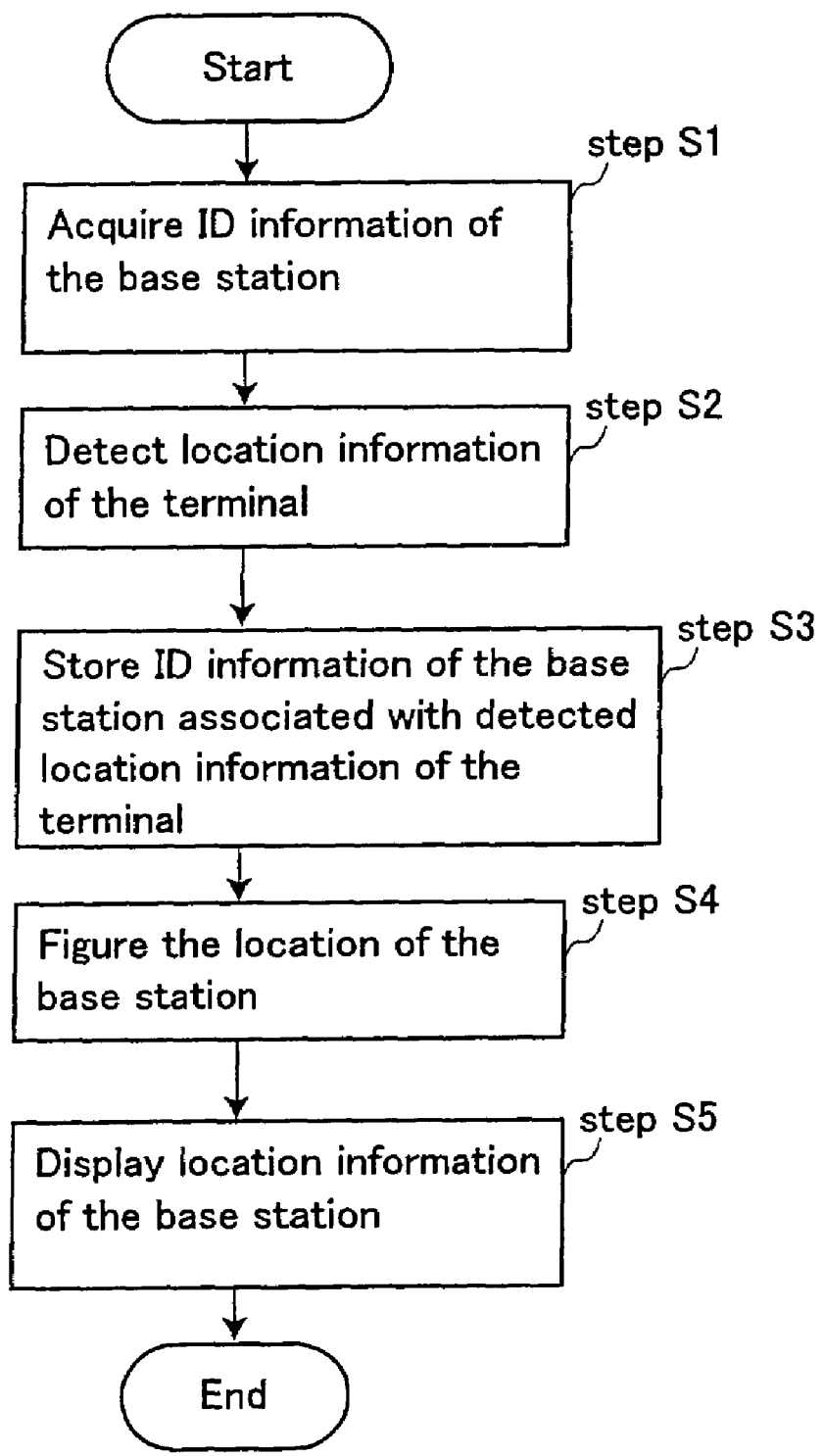
FIG. 3 is a basic flow chart showing a process of mapping location information of a wireless base station which provides contents data to the mobile communication terminal.

FIG. 3 is a basic flow chart showing a process of mapping a location information of a wireless base station which provides contents data to a mobile communication terminal.

First, mobile communication terminal 10 has access to the wireless base station of the wireless LANs to receive contents data by using first wireless communication unit 12. At the same instant, wireless base station identification (ID) information detection unit 14 acquires ID information of the accessed wireless base station (Step S1). The ID information is supplied from the accessed wireless base station.

Next, location detection unit 11 detects the location (position) of the terminal 10 at the time of acquiring the ID information of the accessed wireless base station (step S2).

Next, storage unit 15 stores the acquired ID information of the accessed wireless base station and detected location of the terminal 10 which are associated together (step S3). If the wireless base station broadcast the kinds of service to be provided, storage unit 15 stores such information. Terminal 11 has the function of clock so that storage unit 15 stores the time of the acquiring of ID information of the accessed wireless base station.

Next, location information providing unit 16 figures the location of the wireless base station based on the detected terminal location stored in storage unit 15 if the user desires to display the location of the spot area where wireless base station serves (step S4).

Figure 4:
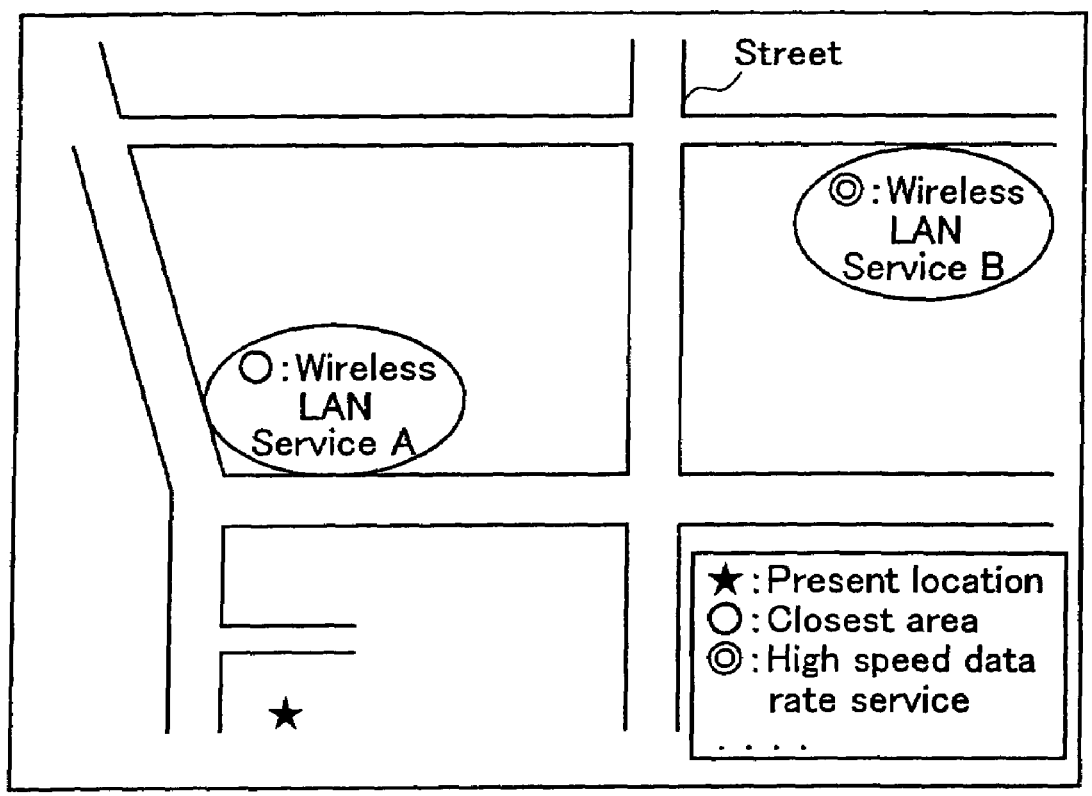
FIG. 4 illustrates one example of display illustrating an embodiment of the invention.

Location information providing unit 16 displays the location of the wireless base station, that is, the spot area where the base station serves in the form of a map (step S5). Location information providing unit 16 shows ID information of said wireless base stations. If storage unit 15 stores the information about kinds of the service together with location of the terminal, unit 16 may show such information. FIG. 4, which will be mentioned after, is the example of showing the spot area, that is, the location of the wireless base station which provides the contents data service with the kinds of service.

Location information providing unit 16 includes display unit such as a liquid crystal display that acts as the display portion of the mobile communication terminal.

In response to conditions entered by the user, a location where a desired service is received may be searched for and the results may be displayed. For instance, the location information providing unit 16 refers to the storage unit 15 and presents the geographically closest location where wireless LAN services can be received when judged from the present position of the user. Furthermore, the location information providing unit 16 may indicate the most inexpensive wireless LAN service if the storage unit 15 stores fee structure information.

One example of the display is shown in FIG. 4. Location information providing unit 16 stores a memory which stores map information. The unit 16 displays the location information by using the stored map. The present location of the mobile communication terminal is displayed on the map. Lines in FIG. 4 indicate streets. The geographically closest service spot area (wireless base station for wireless LAN service A) and the service area of high transfer rate (wireless base station for wireless LAN service B) are shown on the map. If a position specified by the user has been entered, the display may be provided using the position specified by the user as a starting point rather than the present position of the terminal.

Location information providing unit 16 figures the closest location of the wireless base station from the present location of the terminal based on the detected terminal location associated with the acquired identification information of said wireless base stations stored in storage unit 15. Therefore, location information providing unit 16 can display the closet spot area from the result of the result of figuring as shown in FIG. 4.

In the case of FIG. 4, storage unit 15 stores the information about kinds of services for the base stations of wireless LAN service B as a "high speed data rate service". So, unit 16 indicates such information as shown in FIG. 4.

The mobile communication terminal can make reservations for utilization of desired services by specifying the time when the user wants to receive the services from the service provider that offers the services. On arriving at an area covered by a wireless base station that offers the desired services, the user receives the wireless LAN services. For example, if the user makes reservations for the use by adding a request for previously taking large-capacity data about the contents into the base station, the time in which the contents are taken in can be shortened.

The mobile communication terminal 1 finds areas in which the services offered by the wireless base station can be received, based on the present position of this terminal that the location detection unit 11 has detected and also on the positional information of the wireless base stations stored in the storage unit 15. Where areas in which the wireless services can be offered are found in advance, the data about these areas may be stored in the table of storage unit 15.

When the user enters a location where the wireless services can be received by making use of the area information described above, the wireless communication services available near the location are displayed.

Location information positioning unit 16 may be fitted with a loudspeaker. For example, when the user enters a certain service area, the sound-producing unit gives a notice to this effect to the user by sound.

Figure 5:
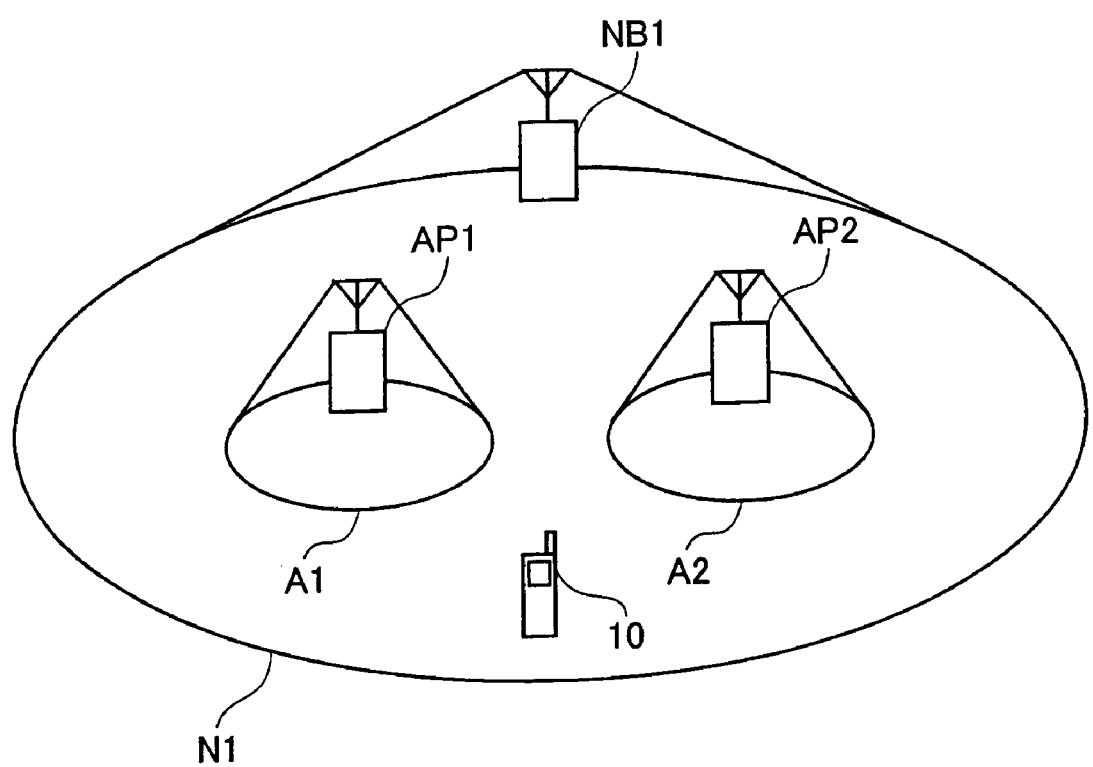
FIG. 5 is a conceptual representation of one example of mobile communication system where the present invention is used.

A system where the present invention is used next conceptually depicted in FIG. 5.

As described before, the mobile communication terminal 10 has the following functions:

i) a function of detecting the location of the terminal itself (such as GPS technology), ii) a function of detecting identification information (e.g., MAC or IP addresses assigned to the wireless base stations) of connectable spot area service base stations (access points (APs)), and iii) a function of mapping the positional information of the terminal itself and the identification information of the connectable base stations.

The user's position is within a wide area N1 of a cellular phone service provider N, the area having a base station NB1. Spot areas A1 (wireless LAN base station AP1) and A2 (wireless LAN base station AP2) of a wireless LAN provider A are present within the wide area N1.

The mobile communication terminal 10 obtains the information of the location of the terminal itself by the GPS technology. Furthermore, the user finds the positions of the spot areas A1 and A2 close to the user by using the function ii).

The mobile communication terminal 10 collects information from the wireless LAN provider base station AP1 or AP2 via the base station NB1 of the mobile phone service provider N.

The terminal may also obtain the identification information of the wireless LAN base stations AP1 and AP2 by communicating with the backbone system of the base station NB1 of the cellular phone service provider N or with the backbone system of the base station AP1 or AP2 of the wireless LAN provider A.

The two sets of information obtained by the functions i) and ii) are interrelated and stored. That is, the location of the spot area where the wireless base stations are present is stored.

The information of the mobile communication terminal 1 and the information about the spot areas A1 and A2 of the wireless LAN provider A are mapped using the function iii) of the mobile communication terminal 10. Thus, information about the available spot areas close to the mobile communication terminal 10 is obtained.

The information about the spot areas includes the location of the mobile communication terminal 1, the distances to the near spot areas, the communication speed of the spot areas, and charges. Spot area information best adapted for real-time use is gained by updating these pieces of information at all times.

Moreover, a spot area that can be regarded as best where the time taken for the user to move into the spot area is taken into account can be selected by considering also already widespread map information and information about the transit time including the traffic means.

Figure 6:
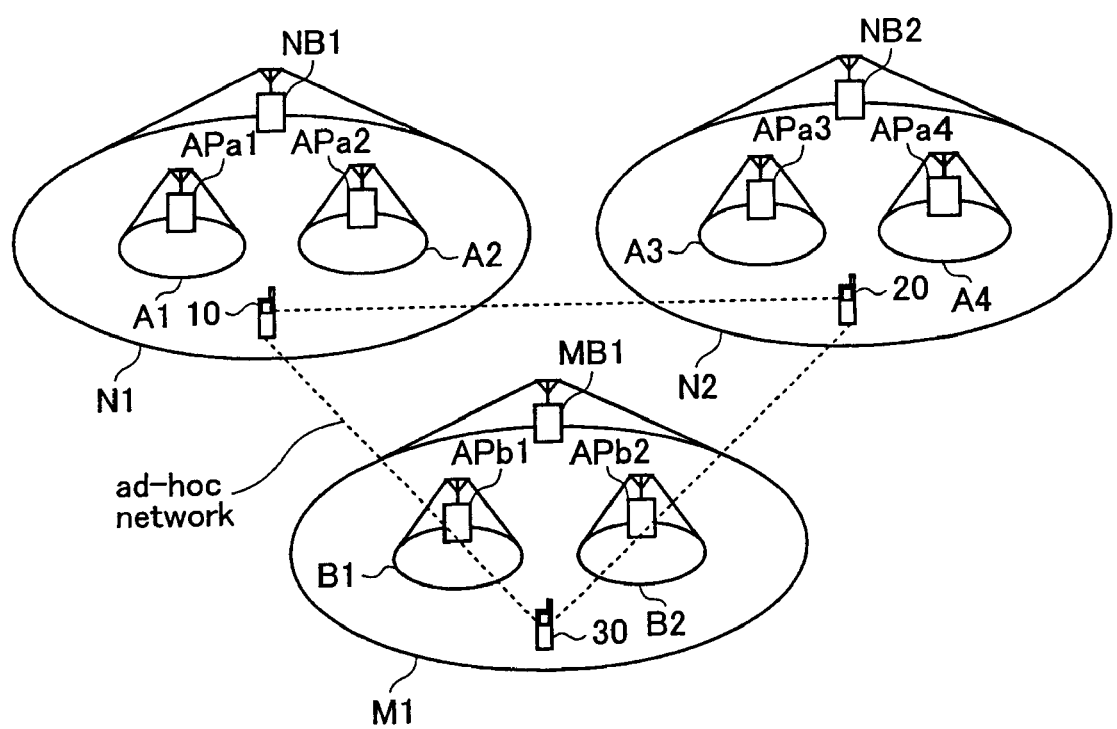
FIG. 6 is a conceptual representation of another example of mobile communication system where the present invention is used.

Another system where the present invention is used is conceptually depicted in FIG. 6. The terminal 10 further includes the following function:

iv) a function of communicating mapping information between mobile communication terminals through an ad hoc network.

The cellular phone service provider N owns the wireless LAN provider A. A cellular phone service provider M owns the wireless LAN provider B.

The mobile communication terminal 10 belonging to the wide area N1 of the cellular phone service provider N is able to realize only the spot areas A1 (wireless LAN base station APa1) and A2 (wireless LAN base station APa2) of the provider A without using an ad hoc network.

A mobile communication terminal 20 belongs to a wide area N2 of the mobile phone service provider N. Spot areas A3 (wireless LAN base station APa3) and A4 (wireless LAN base station APa4) are present within the wide area N2. If the mobile communication terminal 10 is connected with the mobile communication terminal 20 via an ad hoc network, the terminal 10 can obtain information about the spot areas A3 and A4 of the provider A from the mobile communication terminal 20.

Similarly, a mobile communication terminal 30 belonging to a wide area M1 of the mobile phone service provider M is able to realize the information about spot areas B1 (wireless LAN base station APb1) and B2 (wireless LAN base station APa2) of the wireless LAN provider B. If the mobile communication terminal 10 is connected with the terminal 30 by an ad hoc network, the terminal 10 can obtain the information about the spot areas B1 and B2 of the provider B from the terminal 30.

Information about spot areas in a wider area can be received by making use of an ad hoc network in this way. Information about other cellular phone service providers can also be received by making use of an ad hoc network as in the present embodiment.

Figure 7:
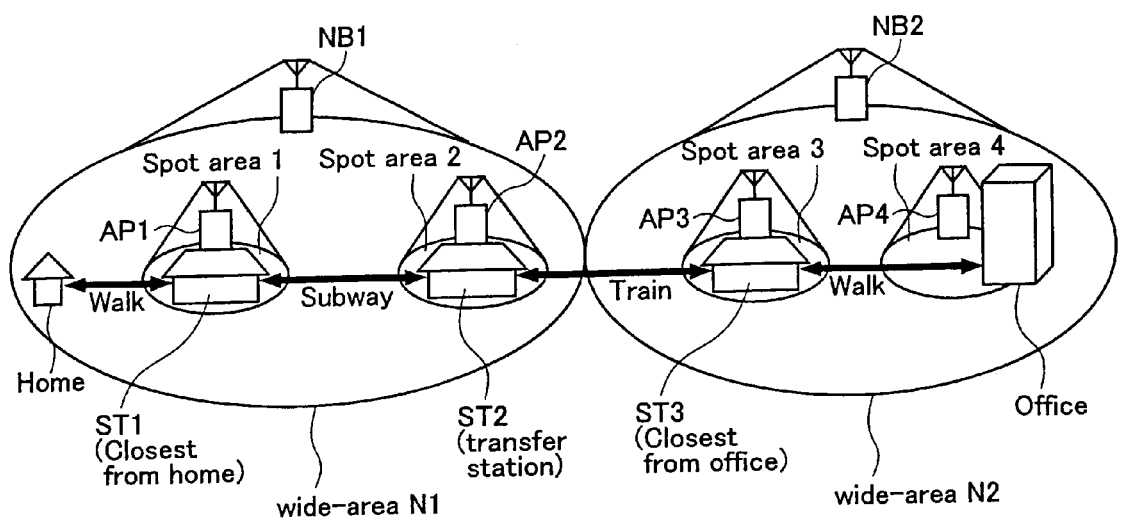
FIG. 7 is a conceptual representation of a further example of mobile communication system where the present invention is used.

Further system where the present invention is used is conceptually depicted in FIG. 7.

Information about a routine life pattern such as commute routes and their time zone is entered into the mobile communication terminal. FIG. 7 shows an example in which a user utilizes a wireless LAN.

The user walks from his home to the closest station ST1, where he takes a subway train. Then, he changes to a train at a transfer station ST2. Thereafter, he gets down from the transfer at a station ST3 closest to his office. Then, he walks to his office. The spot areas available along this commutation interval are four, i.e., SA1 (close to the station ST1), SA2 (close to the station ST2), SA3 (close to the station ST3), and SA4 (close to the office). High-speed communication is offered in the spot area SA4 close to the office at a lower price than in the other three areas SA1, SA2, and SA3. The areas SA1 and SA2 belong to the wide area N1 (base station NB1), while the areas SA3 and SA4 belong to the wide area N2 (base station NB2).

When the user actually receives wireless LAN services in the areas SA1 to SA4 with the mobile communication terminal 1, the identification information of the wireless base stations AP1 to AP4 in the areas SA1 to SA4 is gained. The location information of the mobile communication terminal when the services are offered and the identification information of the wireless LAN base stations are stored in the storage unit.

The user has made a contract for subscription to a newspaper via a wireless LAN. The user makes detail settings using the functions of the possessed mobile communication terminal 1 to obtain necessary information. The terminal automatically downloads the newspaper information during commutation.

In particular, he has made such settings using the mobile communication terminal 1 to automatically download the headings of the newspaper every morning while the user is passing through the spot area SA1 of the closest station ST1.

The user moves from the station ST1 to the station ST2 by subway. During the movement, the user reads the headings of the newspaper and picks up interested articles. Settings have been made to automatically download pieces of information about the contents of the previously picked up articles in the spot area SA2 of the transfer station ST2, the pieces of information having sizes less than normal size. The settings are such that large sizes of information such as information about a moving picture are not downloaded at this time because significant time and cost are spent. Necessary contents are downloaded one after another in the spot area 3 of the station ST3 closest to the office.

The spot area SA4 where high-speed communication can be available at low price is present close to the user's office. The settings are such that information which is about articles picked up and which has a large size such as a moving picture is automatically downloaded in this spot area.

The time taken for the user to walk from his home to the closest station has also been entered as information into the mobile communication terminal 10. When he leaves his home, the mobile communication terminal can automatically inform the spot areas SA1 to SA4 of scheduled times at which he will pass across them by the mobile phone and make reservations for receiving data download services.

In the cases described so far, routine life patterns are fixed. Utilization of a wireless LAN during movement can be scheduled efficiently by entering a destination whenever a movement is made. Where this is used in combination with the separate schedule functions fitted in the mobile communication terminal, downloading can be scheduled optimally while grasping plural scheduled movements. This enables more efficient usage.

The wireless LAN services used by the user himself are recorded and stored, together with the corresponding positional information and information about the wireless LAN base stations in this way. Therefore, the wireless LAN services in the region where the user himself takes actions can be mapped. Furthermore, wireless LAN services in a wider area can be mapped by making active use of information collected by other terminals in combination.

For example, wireless LAN service points giving the shortest distance can be shown by displaying the present position of the user and information indicating the wireless LAN service areas in combination.

In addition, areas where wireless LAN services conforming to the purpose are available can be displayed by searching for wireless LAN service conditions (e.g., charges and data transfer speed).

In the past, the user has been urged to select wireless LAN spot areas either from "in-area" information previously obtained by separate means or from a huge amount of general-purpose information including a large amount of information unnecessary for the user. On the other hand, in the present invention, it is possible to search for desired service areas based on service area information possessed by the mobile communication terminal itself. The burden imposed on the user in making such a search can be alleviated greatly.

The database about the spot areas is accumulated with the user's mobile communication terminal based on a user-oriented concept. Thus, communicable ranges in spot areas and detailed communication information can be recognized while depending on the information in the database within the mobile communication terminal possessed by the user rather than information from communications service providers.

Obviously, the present invention is not limited to the foregoing embodiments but rather various changes and modifications are possible without departing from the gist of the invention. For example, a combination of services that are available in large cells with mobile phones and services that are available in small cells with wireless LANs is used. Besides, a combination of services that are available in large cells with PHS (personal handy phone system) and services available in small cells with fixed wireless access may be used with similar advantages.

What is claimed is:

1. An apparatus used in a first mobile communication system with a plurality of wireless base stations, the first mobile communication system operated by a first provider, the apparatus comprising:
   first means for acquiring identification information of the plurality of wireless base stations;
   second means for detecting a present location of the apparatus on acquiring the identification information of the plurality of wireless base stations;
   third means for storing first service location information with respect to the first provider in which the identification information acquired by the first means is associated with the present location of the apparatus detected by the second means; and
   fourth means for calculating locally a location of the plurality of wireless base stations using the detected present location of the apparatus stored in the third means, and to exchange locally calculated first service location information and second service location information with respect to a second provider through an ad hoc network with a second apparatus in a second mobile communication system that is operated by the second provider, wherein
   the fourth means is configured to provide a user with information based on the first service location information and the second service location information.

2. The apparatus according to claim 1, wherein the fourth means has map information, and is configured to add information of the calculated location of the plurality of wireless base stations to the map information.

3. The apparatus according to claim 2, wherein the fourth means is configured to display the map information indicating the calculated location of the plurality of wireless base stations.

4. The apparatus according to claim 1, wherein the mobile communication system is a wireless local area network system being compliant with a standard of IEEE 802.11.

5. The apparatus according to claim 1, further comprising a fifth means for communicating with the plurality of wireless base stations, the communication unit being adapted to a standard of IEEE 802.11.

6. The apparatus according to claim 1, further comprising a cellular telephone unit configured to perform cellular communication with a cellular base station being a part of a cellular network.

7. The apparatus according to claim 1, wherein the first means is configured for acquiring identification information of the plurality of wireless base stations which is included in a signal transmitted from the plurality of wireless base stations.

8. The apparatus according to claim 6, wherein the first means is configured for acquiring identification information of the plurality of wireless base stations which is included in a signal transmitted from the cellular base station.

* * * * *